June 7, 1960 G. L. IRVINE ET AL 2,939,978
DEFLECTION YOKE
Filed Oct. 16, 1957
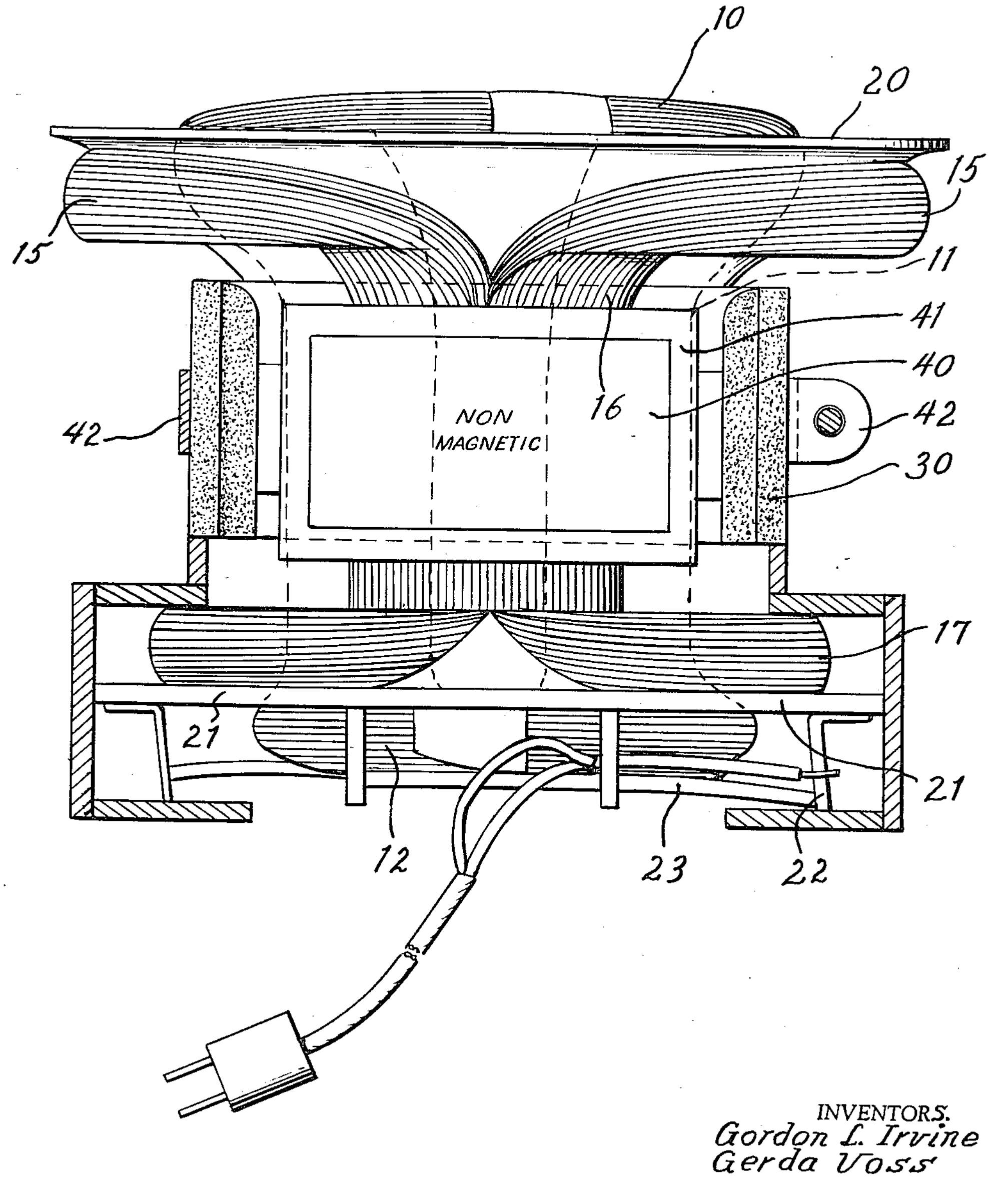
INVENTORS.
Gordon L. Irvine
Gerda Voss
By J. D. Douglass
their ATTORNEY 2,939,978

DEFLECTION YOKE

Gordon L. Irvine, Cooksville, Ontario, and Gerda Voss, Toronto, Ontario, Canada, assignors to Canadian Admiral Corporation, Ltd., Port Credit, Ontario, Canada Filed Oct. 16, 1957, Ser. No. 690,493

7 Claims. (Cl. 313—76)

This invention relates to improvements in television receivers and more particularly to a method and apparatus for controlling the linearity and width of the picture or raster produced by the deflected beam in the picture tube.

As is well known to those versed in the art, the electron beam of a cathode ray picture tube is deflected horizontally and vertically in synchronous relation to each other to provide a raster of a predetermined height and width.

The height of the picture is controlled by a vertical deflection circuit and the width of the picture by a horizontal deflection circuit. The beam is more commonly deflected in two ways, either by electrostatic deflection or by magnetic deflection. Magnetic deflection is provided by coils which are disposed alongside the neck of the tube in such a position that current in the vertical coils cause the beam to be deflected vertically and current in the horizontal coils cause the beam to be deflected horizontally. The vertical beam is deflected at the rate of 60 cycles per second and the horizontal beam is deflected at the rate of 15,750 cycles per second. Both of said coils which control the beam effect a control through currents that are produced in the coils derived from the vertical and horizontal sweep circuits.

In connection with the horizontal deflection coils, it is common to have the current through the coils increase to a predetermined amount and then decrease suddenly by use of some form of oscillator, held in step by the synchronization signals from the station. The amplitude of the current in the horizontal amplifier determines the width or amount of deflection of the beam and the shape of the wave form of current in the output of the horizontal amplifier determine the manner in which the beam is deflected across the face of the tube. The manner in which the beam is deflected across the face of the tube is commonly characterized by the term "linearity." A beam deflected at a constant rate has a good linearity whereas a beam deflected at a rate which varies as it traverses the tube has poor linearity. Usually the manufacturer strives to generate a wave form in the horizontal amplifier that is of a saw-tooth variety, with the rising portion of the curve linear. Since the first portion of the rising curve is usually realized from the back voltage produced by the damper tube and the remainder of the curve by the horizontal output tube and the two combined to provide a saw-tooth wave, circuit control means is usually provided to enable the shape of the beam, within certain limits, to be controlled in order to correct for non-linearity due to circuit and tube tolerances and limitations.

Usually the above has been effected by providing a width and a linearity control each of which may be adjusted to provide the proper width and the best degree of linearity in the final stages of production.

There is a disadvantage in having these controls however because the controls are usually in the form of a potentiometer or adjustable coils and are expensive as well as requiring more time for installation. Another important disadvantage resides in the fact that these controls are available for adjustment by unauthorized persons who, not being qualified to make such adjustments, tamper with the same and cause a resultant deterioration of the picture which they attribute to the manufacture of the set rather than the fact that they have tampered with the set. It is therefore desirable, to eliminate all except the most essential conrols, to not only cheapen the cost of the receiver but to prevent persons with inexperience from tampering with the controls and spoiling the fidelity of the picture. It has been found that in the horizontal circuit it is particularly possible to eliminate the linearity and width controls. One of the problems however, has been to provide the proper linearity without affecting the width to the detriment of the set.

In the present invention, it is possible to improve the linearity by control means disposed within the yoke, without causing a serious deterioration of the width.

Briefly, it comprises a means for insertion in the flux field of the horizontal coils such that eddy currents are set up within the device, acting in opposition to the flux of the field, to improve the linearity and or control the width.

In the drawing, the figure of the drawing shows a view of a yoke for a television receiver wherein certain portions have been broken away and shown in section to more clearly depict the invention.

As can be seen from the drawing, there is provided a horizontal deflection winding 10 which, in this case, consists of a pair of skein-like coils, the upper portion end of each being shaped with an outward slant adapted to engage with the bell of the picture tube. The upper end connects with a pair of longitudinally extending flat runs 11 disposed alongside the neck of the tube and connected by a lower loop 12. There is a pair of such coils, each coil of the pair being disposed upon opposite sides of the neck of the tube with the runs 11 of the opposite coils being adjacent to each other and on one side of the tube and the other opposing runs being on the opposite side of the tube and adjacent to each other. Preferably, the inner faces of these coils are formed to an arcuate form so that they may be brought into close proximity to the neck of the tube and hence the gun, thus exercising the greatest effect upon the electron beam.

Likewise, the vertical coils comprise the outwardly shaped upper ends 15, the horizontal runs 16 and the lower connecting portions 17. The ends of the vertical coils are disposed inwardly of the horizontal coils. The runs extending along the neck of the tube of the opposite coils are adjacent to each other and disposed inwardly of the opposite runs of a single coil of the horizontal winding. Usually a suitable form indicated at 20 is provided for holding the coils in position and a terminal ring 21 is also provided having lugs 22 to which the wires 23 leading to the coils may be secured. A highly permeable material, which may be called a core, surrounds the straight portions of the coils and may comprise four segments 30 of ferro-magnetic material, a number of which are on the market and well known to those versed in the art. This material provides an annular flux path around the coils and is preferably of a material not subject to permanent magnetization but having a high permeability in order that the effective inductance of the coils may be increased and a flux path be provided exteriorly of the coils to prevent extraneous magnetic radiation and to concentrate the flux path interiorly of the yoke. The above construction is well known to those versed in the art.

As previously stated, the horizontal coils conduct what is commonly known as the saw-toothed current wave the shape of which is controlled largely by the circuitry of the horizontal oscillator and amplifier and its associated components. The removal of the width and linearity controls with the attempt at simplification, has resulted in a horizontal deflection system which is characterized by some degree of inherent non-linearity which is observed as a stretching of the raster or picture near the beginning of the horizontal scan and a crowding or compression near the end of the scan.

It has been found however, that by this invention the linearity may be greatly improved by providing a material which is inserted between the core and the coil at a point where it has an effect upon the horizontal coils but no effect upon the vertical coils. One means for accomplishing this effect comprises the provision of a sheet of aluminum foil 40 having a width less than the core 30 and a length approximately equal to the space between the horizontal runs of one of the horizontal deflection coils and placed opposite to what would normally be considered the opening in one of the deflection coils.

It is appreciated that width alone has previously been controlled by the use of a cylindrical sleeve which could be inserted between the neck of the tube and the coil windings and adjustable inwardly and outwardly to control the width. The sleeve of the prior art however was of little practical use in controlling linearity because when it was placed within the coil far enough to have any control on the linearity it decreased the width of the picture beam to such an extent that it was a useless expedient. Furthermore, this previous control was in a position where it could be tampered with by unauthorized persons, and being within the field was subject to the accumulation of an electrostatic charge, making it necessary to ground the shield, otherwise the person touching it would obtain a shock. The present shield is supported around the core upon a piece of tape 41 of insulating character and, once the proper size is determined by experimentation, may be placed in position for a complete run of television receivers being held in place by the magnetic core 30 which being of the segmental variety is usually held in place by a clamp 42 in a manner well known in the art. The material may be very thin and may be of any non-magnetic material such as aluminum, copper or brass.

The improvement in the linearity of the horizontal scan is effected partly in directly modifying the deflection field and partly in modifying the deflection current. Eddy currents and their resultant opposing magnetic fields are set up in the conducting material which are proportional to the rate of change of the field producing them. This tends to equalize the effects of a non-linear deflection current. Also losses introduced by these eddy currents tend to affect the first half of the horizontal scan more than the last half of the scan because of the difference in source impedances of the two circuits producing the respective deflection currents. It is apparent however that other theories of operation than the one presently considered may later be evolved without effecting the results realized which, as stated, are to provide an improvement in the linearity without decreasing the width, as is common in the prior art.

We have found that the best results are obtained by a single piece of aluminum foil disposed as stated. However, good results can also be obtained by more than one piece of aluminum foil properly placed to control the flux in the manner described. Since aluminum foil in this instance is operated in conjunction with or against the higher frequency of the horizontal deflection yoke where it is effective, it has little or no effect upon the vertical coil which is operating at 60 cycles. In addition, it is disposed opposite to adjacent runs of opposite vertical deflection coils.

Placing the control within the yoke as stated, enables it to be adjusted during the manufacture of the device and puts it out of the way of subsequent tampering by unauthorized persons. In addition, by placing it in the position shown, it cannot be damaged by the removal or insertion of tubes through the yoke and enables a yoke to be used wherein the runs of the coil may be placed closer to the neck of the tube. A metallic member placed next to the neck of the tube requires additional space and additional insulation to prevent shorting of the coils.

Having thus described our invention in an embodiment thereof, we are aware that numerous and extensive departures may be made therefrom without departing from the spirit or scope of the appended claims.

We claim:

1. A deflection yoke for deflecting the electron beam of a cathode ray tube comprising pairs of horizontal and vertical beam deflecting coils, each of said pairs of coils comprising a pair of inductive windings, each of which is disposed on diametrically opposite sides of the yoke, and each of said pairs being displaced 90° relative to the other, field controlling means for the horizontal deflection coils comprising a conductive non-magnetic eddy current producing device disposed within the field of the horizontal deflection coils.

2. A deflection yoke for use in conjunction with the deflection of the electron beam in a cathode ray picture tube or the like comprising pairs of vertical and horizontal deflection coils, each pair of coils comprising an inductive winding, and each coil of each pair including longitudinally extending portions arranged to extend alongside the neck of a picture tube, and wherein the longitudinal portions of one of said horizontal coils are disposed adjacent to the respective longitudinal portions of the other of said horizontal coils on the opposite side of said tube neck with the longitudinal portions of the vertical coils interposed between those of the horizontal coils, magnetically permeable means for said parts of said coils surrounding the coils and providing a low permeability path, means for controlling the magnetic flux produced by the horizontal deflection coils to determine the effective linearity and width of the raster or picture produced by the cathode ray being controlled comprising conductive non-magnetic means reactive to the flux produced in the horizontal winding for controlling the linearity without material reduction in the width of the beam.

3. A deflection yoke as described in claim 2, wherein said last mentioned means comprises a non-magnetic metallic layer disposed between the windings and the magnetically permeable means.

4. A deflection yoke as described in claim 2, wherein said last mentioned means comprises a sheet of non-magnetic conductive material capable of producing eddy currents acting in opposition to change in the flux generated by the horizontal coils.

5. A deflection yoke as described in claim 2, wherein said last mentioned means comprises a sheet of conductive non-magnetic metal of less width and length than the opening in the horizontal coil and wherein said sheet of metal is disposed in a flux controlling position for at least one of said horizontal coils.

6. A deflection device as described in claim 2, wherein said last mentioned means comprises a sheet of thin non-magnetic metal foil and wherein said sheet of foil is disposed in the magnetic field of the horizontal deflection coils in a position to intercept and control the flux produced by a portion of the coils.

7. A deflection yoke as described in claim 2, wherein said last mentioned means is a non-magnetic metallic member and is disposed in the space opposite to the opposite runs of one of said coils and across adjacent runs of said vertical coils.

References Cited in the file of this patent

UNITED STATES PATENTS

| | | |
|---|---|---|
| 2,562,395 | Schlesinger | July 31, 1951 |
| 2,569,343 | Scull | Sept. 25, 1951 |
| 2,704,816 | Fernsler | Mar. 22, 1955 |